United States Patent
Tornberg

(10) Patent No.: US 11,839,222 B2
(45) Date of Patent: Dec. 12, 2023

(54) VEGAN POTATO EMULSION

(71) Applicant: Veg of Lund AB, Malmö (SE)

(72) Inventor: Eva Tornberg, Lund (SE)

(73) Assignee: Veg of Lund AB, Malmö (SE)

( * ) Notice: Subject to any disclaimer, the term of this patent is extended or adjusted under 35 U.S.C. 154(b) by 0 days.

(21) Appl. No.: 16/871,072

(22) Filed: May 11, 2020

(65) Prior Publication Data

US 2020/0323228 A1  Oct. 15, 2020

Related U.S. Application Data

(63) Continuation of application No. PCT/SE2019/051192, filed on Nov. 25, 2019.

(30) Foreign Application Priority Data

Nov. 26, 2018 (SE) .................. 1851457-0

(51) Int. Cl.
| | |
|---|---|
| *A23C 11/10* | (2021.01) |
| *A23L 19/12* | (2016.01) |
| *A23L 29/10* | (2016.01) |
| *A23L 29/30* | (2016.01) |
| *A23L 35/00* | (2016.01) |
| *A23L 2/52* | (2006.01) |

(52) U.S. Cl.
CPC .............. *A23C 11/10* (2013.01); *A23L 2/52* (2013.01); *A23L 19/12* (2016.08); *A23L 29/10* (2016.08); *A23L 29/30* (2016.08); *A23L 35/10* (2016.08); *A23V 2002/00* (2013.01)

(58) Field of Classification Search
CPC ....... A23C 11/10; A23V 2002/00; A23L 9/12; A23L 29/10; A23L 29/30; A23L 35/10; A23L 2/52
USPC ................ 426/564, 569, 590, 599, 615, 637
See application file for complete search history.

(56) References Cited

U.S. PATENT DOCUMENTS

| | | |
|---|---|---|
| 2012/0135125 A1 | 5/2012 | Muschiolik et al. |
| 2016/0050950 A1 | 2/2016 | Schmitt et al. |
| 2017/0105437 A1* | 4/2017 | Gordon ................ A23G 3/48 |
| 2019/0116852 A1* | 4/2019 | Kinkelaar ........... A23L 29/238 |

FOREIGN PATENT DOCUMENTS

| | | |
|---|---|---|
| SE | 1050965 A1 | 1/2012 |
| WO | 00/22939 A2 | 4/2000 |
| WO | 2016/049577 A1 | 3/2016 |
| WO | 2017/211635 A1 | 12/2017 |
| WO | 2018/085323 A1 | 5/2018 |

OTHER PUBLICATIONS

Monica, Homemade Vegan Coffee Creamer, Nov. 2, 2018, www.thehiddenveggies.com/coffe-creamer/.*
Fleming, A., Potato Milk, Go Dairy Free, 2007, https://www.godairyfree.org/recipes/milk-subs/potato-milk-vegan-gluten-free-soy-free.*
Lotzkar et al., Pectin as an Emulsifying Agent, Industrial and Engineering Chemistry, 1943, vol. 35, No. 12, pp. 1294-1297.*
Leroux et al., Emulsion Stabilizing Properties of Pectin, Food Hydrocolloids, 17 (2003), pp. 455-462.*
Notification of Transmittal of the international Search Report and the Written Opinion dated Jan. 7, 2020 for PCT/SE2019/051192 filed on Nov. 25, 2019, 14 pages.
Alfredsson, E. "The Manufacture of a Vegetarian Smoothie," Chemistry 240 hp, Linnaeus University, Department of Food Technology, School of Natural Sciences, 2010, pp. 1-53.

* cited by examiner

*Primary Examiner* — Leslie A Wong
(74) *Attorney, Agent, or Firm* — Grüneberg and Myers PLLC

(57) ABSTRACT

A vegan, potato emulsion includes heat treated potato in an amount of 0.5-20% by weight. The emulsion further comprises at least one sugar in an amount of 0-5% by weight; at least one vegetable emulsifier in an amount of 0.09-1.0 by weight; at least one oil in an amount of 0.50-6% by weight; at least one added vegetable protein in an amount of 0.20-3% by weight; and water adding up to 100% by weight. The emulsion has an oil droplet size D[3,2] of 0.1-10 μm. The potato emulsion is whitish, and is whippable providing a foam.

13 Claims, No Drawings

VEGAN POTATO EMULSION

CROSS REFERENCE TO RELATED APPLICATIONS

The present application is a bypass continuation of PCT Application No. PCT/SE2019/051192, filed Nov. 25, 2019, and claims priority to Swedish Patent Application No. 1851457-0, filed Nov. 26, 2018, the entire contents of both of which being incorporated herein by reference.

TECHNICAL FIELD OF THE INVENTION

The present invention is related to a vegan, potato emulsion comprising heat treated potato, sugar, a vegetable emulsifier, an oil and a vegetable protein, wherein the emulsion has an oil droplet size D[3,2] of 0.1-10 µm. The potato emulsion is whitish, and is whippable providing a foam. It can be used as an alternative to milk to consume as such or used as an additive in a drink such as coffee or tea.

BACKGROUND ART

Veganism is steadily growing throughout the world and means refraining from the use or consumption of animal products. Vegan food does not contain any animal-derived components, animal products or byproducts. Thus, vegan food only contains plant-based components.

Dietary vegans (or strict vegetarians) refrain from consuming animal products, not only meat but also eggs, dairy products and other animal-derived substances. This is a challenge and an opportunity for the food industry in preparing alternatives for certain existing animal derived food products and beverages. Dairy-products such as milk are not consumed by vegans. Alternatives to cow milk for consumption as such or as a supplement in different food products are desired by the vegan community. One field where dairy products usually are used are in drinks such as coffee or in tea. In addition, there is a growing trend of providing beverages, such as in a cappuccino or caffe latte, with a stable foam of milk on top of the drink product and another portion of the milk remaining in the drink product.

WO2010/043332 discloses a whipping agent comprising fat, protein and emulsifier. The protein used is sodium caseinate or whey protein powder, which are both dairy proteins. The whipping agent is non-vegan and is preferable presented as a powder. In addition, no potato is used.

WO2016/049577 discloses whippable food products comprising dietary fibre, protein, food starch, emulsifier, hydrocolloid, fat, and water.

Hydrocolloids are well known thickeners and gelling agents used in food formulations to improve shelf-life and quality. Also in this patent dairy proteins are suggested as emulsifiers, such as hydrolysed casein and Angel-type egg white.

WO2018/085323 discloses a pressurized composition, in a delivery system, comprising sugar, oil, milk protein concentrate, caseinate, stabilizer, emulsifier and buffering agent. The composition is non-vegan due to the presence of caseinate and milk protein concentrate.

PCT/SE2018/051007 discloses a potato based emulsion comprising vegetable oil, heat treated potato, fruit and vegetables and water, wherein oil drops in the emulsion have a diameter (D[3,2]) of less than 90 µm. The emulsion as disclosed in said patent document cannot be used as a substitute for milk.

There is still a need within the technical field to provide vegan beverages, as an alternative to milk, which are whippable and whitish and can be used as alternatives to milk as such or in coffee or tea, such as in a cappuccino, caffe latter or chailatte.

SUMMARY OF THE INVENTION

It has surprisingly been provided according to the present invention a vegan, potato emulsion which is an excellent substitute for milk. The potato emulsion has similar properties to milk and can be consumed as such or used as an additive in a drink such as tea of coffee.

The present invention is related to a vegan, potato emulsion comprising:
heat treated potato in an amount of 0.5-20% by weight;
at least one sugar in an amount of 0-5% by weight;
at least one vegetable emulsifier in an amount of 0.09-1.0% by weight;
at least one oil in an amount of 0.50-6% by weight;
at least one added vegetable protein in an amount of 0.20-3% by weight; and
water adding up to 100% by weight,
wherein the emulsion has an oil droplet size D[3,2] of 0.1-10 µm.

FIGURES

No figures are provided herein although it is noted that FIG. 1 of parent PCT application PCT/SE2019/051192 is a color image showing potato emulsions using rapeseed, sunflower and soybean lecithins (with and without potato flakes) at concentrations of 0.18% together with 0.22% a potato protein as emulsifiers seen from the left to the right.

Definitions

By the term "heat treated potato" it is herein meant a source of potato being heated to above 95° C., such as to about 98-100° C. and 115-121° C.

By the term "vegetable oil" it is meant oil that is obtained from vegetabilic sources. The preferred sources are further described below.

By the term 'source of potato' and 'potato' it is herein meant potato in any form and from any origin. The potato may for example be in the form of potato flakes or as whole potato or in potato cubes. However, there is no limitations in the form of the potato.

By the term "potato flake" it is herein meant whitish flakes, where 30-65% of the flakes have a size of the non-limiting range of 1-3 mm.

By the term "potato cube" it is herein meant cubes of potato, or substantially cube formed potato, with about a non-limiting 10 mm side length.

DETAILED DESCRIPTION OF INVENTION

In particular, the present invention is related to a vegan, potato emulsion comprising:
heat treated potato in an amount of 0.5-20% by weight
at least one sugar in an amount of 0-5% by weight;
at least one vegetable emulsifier in an amount of 0.09-1.0% by weight;
at least one oil in an amount of 0.50-6% by weight;
at least one added vegetable protein in an amount of 0.20-3% by weight; and
water adding up to 100% by weight, wherein the emulsion has an oil droplet size D[3,2] of 0.1-10 µm.

The specific combination of technical features of the potato emulsion provides beneficial features such as avoidance of feathering, having a stable foam upon whipping of the potato emulsion as well as having a nice taste. Using potato is also beneficial from a sustainability perspective since it is the crop that gives the most food per cultivated area especially in Nordic countries. The emulsion of the present invention comprises a source of potato which has been heat treated before being added to the emulsion. The source of potato can be pretreated and provided in the form of potato flakes. It can also be provided in the form of whole potato and/or potato cubes which have been heat treated.

In an embodiment of the invention the heat-treated potato is chosen from potato flakes which have been heated to at least 100° C. or whole and/or potato cubes which have been pasteurized at at least 98° C., or have been autoclaved at about 115-121° C.;

It has been found that when potato flakes are chosen to be included in the emulsion the source of potato has been heated to at least 100° C. during evaporation. It has also been found that when the source of potato is in the form of whole potato and/or potato cubes they shall be either pasteurized at 98° C. for 25-30 min with a total heating time of 68 min. or heated by autoclaving at about 115-121° C. (pressure of 2 bar) for 32 min. with a total heating time of 55-60 min.

The source of potato is present in an amount of 0.5-20% by weight, for example 0.5-10% by weight. For example, the heat treated potato is present in an amount of 1, 1.5, 2, 2.5, 3, 3.5, 4, 4.5, 5, 6, 8, 10, 12, 14, 16, 18 or 20% by weight.

The at least one sugar is selected from the group consisting of a monosaccharide such as glucose, fructose or galactose, a disaccharide such as sucrose, or maltose, and a polyol, i.e. a sugar alcohol such as mannitol, sorbitol, or xylitol. The invention is not limited to the specific sugar chosen. The sugar is present in an amount of 0-5% by weight, for instance 1-5% by weight, eg 1, 2, 3, 4 or 5 by weight. The added sugar provides a sweet taste and conceals the taste of the potato which may be undesirable.

The at least one emulsifier is selected from vegetable lecithin, such as selected from the group consisting of rapeseed lecithin, sunflower lecithin, and soy lecithin, where especially deoiled rapeseed lecithin and deoiled sunflower and deoiled soy lecithin can be used. The at least one emulsifier may be added to the potato emulsion via the at least one oil. It will be understood that also different combinations of emulsifiers such as different lecithins can be chosen to be included in the emulsion. The at least one emulsifier is present in an amount of 0.09-1.0% by weight. The emulsifier may be present in an amount of 0.1, 0.15, 0.2, 0.25, 0.3, 0.35, 0.4, 0.45, 0.5% by weight. The benefits of including an emulsifier is the avoidance of feathering and providing a stable foam upon whipping the emulsion.

The at least one oil is selected from the group consisting of rapeseed oil, olive oil, maize oil, sunflower oil, soybean oil, coconut oil, peanut oil, sesame oil, linseed oil, avocado oil, walnut oil, pistachio oil, and hazelnut oil. It will be understood that also different combinations of vegetable oils can be chosen to be included in the emulsion. The at least one oil is present in an amount of 0.5-6% by weight, e.g. 1, 1.5, 2, 2.5, 3, 3.5, 4, 4.5, 5, 5.5 or 6% by weight. The at least one added vegetable protein is selected from a potato protein, a pea protein, or soy protein or any other vegetable protein. The vegetable protein may be added in liquid form or added as a powder. The vegetable protein may be added via the water phase. It will be understood that also different combinations of vegetable proteins can be chosen to be included in the emulsion. Thus, the added protein is not from the potato source itself as used in the potation emulsion of the invention. The at least one added vegetable protein is present in an amount of 0.2-3% by weight, e.g. about 0.5, 0.7, 1.0, 1.5, 2.0, 2.5, or 3% by weight. The vegetable protein is acting as an emulsifier in the emulsion.

In an embodiment of the invention the potato emulsion additionally comprises of at least one pH regulating agent in order to increase the pH to typically 6.5 to 7.5, especially to 6.5 to 7.0. It is especially important to increase the pH of the potato emulsion when it is to be added to coffee, which normally has a pH value of 4.5-5.5. Any pH regulating agent ordinary for consumption may be used, examples of pH regulating agents are $Na_2HPO_4$—$NaH_2PO_4$ and $K_2HPO_4$—$KH_2PO_4$. These pH regulating agents (also named buffers herein) confer a lowered bitterness of the potato milk by itself and in a drink.

In an embodiment of the invention any other flavouring agent such as cocoa, may also be added to the potato emulsion, in addition to sugar, to conceal the potato flavour or to provide another taste of the potato emulsion.

The potato emulsion of the invention comprises oil droplets of a defined size. It has been found that the majority of the oil drops have a diameter D[3,2] of 0.2-10 µm, preferably a diameter within the interval of 0.2-5 µm, or 0.2-3 µm to provide a potato emulsion with whitish colour and with a good texture, which was experienced in the sensory evaluation as performed in the experiments. Furthermore, the oil droplets are not flocculated, which is important for the droplets not to cream. The industrial production of the potato emulsion as disclosed in the experimental part provides an emulsion having the majority of the oil drops in the range from 0.5-3 µm (D[3,2]). This industrially produced potato emulsion also has a whiter appearance, good foaming performance and a nice taste.

In an embodiment of the invention the potato emulsion is used as a vegan alternative to milk to consume as a drink as such or as a supplement in a coffee or a tea. An advantage of using the potato emulsion of the invention is that it does not give rise to any "feathering" (aggregation of oil droplets and/or protein aggregation) and is whippable and upon combination with coffee or tea a portion thereof is provided as a stable foam on the top of the coffee or tea and a portion is remained in the coffee or tea, thus providing a vegan cappuccino, cafe latte or chailatte.

EXAMPLES

By way of examples, and not limitation, the following examples identify a variety of beverage compositions pursuant to embodiments of the present invention.

A source of heat treated potato is included in the emulsion.

Description of Methods Used in the Patent Vegan Potato Milk

Determination of Particel Size Distribution (PSD)

The particle size distribution (PSD) of the emulsion droplets D[3,2] and the starch granules D[4,3] has been measured using a laser diffraction analyser (Malvern Mastersizer). The mean particle size can be calculated based on the volume or the area occupied by the particles, expressed as $d_{43}$ (also written as D[4,3]) and $d_{32}$ (also written as D[3,2] herein), respectively.

$$d_{43} = \sum_i n_i d_i^4 \Big/ \sum_i n_i d_i^3$$

$$d_{32} = \sum_i n_i d_i^3 \Big/ \sum_i n_i d_i^2$$

Where $n_i$ is the percentage of particles with diameter $d_i$.

Foaming Experiment

This experiment is performed by having a tube connected to a crane with air and the flow is adjusted. Add 15 ml of the sample to a graduated cylinder and insert the tube with air supply to the bottom. Wait 15 s and then remove the tube. Measure the height of the foam (from the surface of the milk to the top of the foam) and then record how many seconds it takes for the foam to disappear.

Another foaming test was worked out, where 130 ml of prepared potato emulsion was added into a nepresso machine, which is able to stir and heat on the same time and has been especially designed to foam ordinary milk to be used in coffee. Stirring with heat (read on-button) went on for 1 min. The foam was directly poured into a 400 ml beaker and the amount of foam was read off in ml from the beaker and subtracted from the original amount. This is the original foam height. The foam drainage was obtained by letting the foam stand for 5 min., where after the foam height is read off again. The foam drainage in ml/min is achieved by subtracting the foam height after 5 min. from the original foam height and this difference was divided with 5 min.

Emulsion Preparations in the Lab

The ingredients were mixed with a handmixer for 2 min. The emulsion was then homogenized using a Tetra Pak homogenizer with a pressure of 150 bar or a valve homogenizer (Panda) at a pressure drop of 150-200 bar. All the samples were then pasteurized (90° C., 30 s)

Emulsion Preparation in the Industry

A tank was filled with 60% of the water to be used. With vacuum the dry ingredients were sucked into the tank, wherein the bottom of the tank a mixer was placed. A water-based premix of the buffer system was introduced into the tank and thereafter a mixing of the ingredients was performed during 5 min. Then another premix of the oil and the lecithin was filled into the tank from the bottom and emulsification was done at a high speed during 5 min. Finally, the rest of the water was added and another emulsification was performed at the highest speed for 5 min. The emulsion was then pumped into the heating (UHT) plant. The emulsion was pre-heated to 95° C. in a plate heat exchanger and then steamed to 142° C. for 10 s. The temperature of the sample was flashed back to 80° C. with vacuum and valve homogenized at that temperature (170 bar/30 bar). The emulsion was then chilled with a heat exchanger down to 20° C.

Preparation of Source of Potato

Different sources of potatoes were prepared according to the same methodolgy as described in the patent application PCT/SE2018/051007.

Experiment 1—Potato Flakes and Protein

In the first experiment the ingredients were potato base and oil, where after a potato protein, Solanic®200 from AVEBE, was added in two different concentrations, namely 0.5% and 1% added protein. As an alternative, Solanic®300 may be used as a potato protein. The amount of potato flakes (Ecological Kebelco potato flakes) was 5.8 gram (2.9%), water 182.2 grams (91.1%) and oil 12 gram (6%). All the samples were characterized with PSD measurements, sensory analysis, microscopic observations and foaming.

In the sensory evaluation two milk-like emulsions were tested; one with 0.5% protein and 3% fat, and another one with 1% protein and 3% fat, respectively. The emulsion with the lowest protein concentration has an off-taste but manageable and gives a foam as well. For the latter emulsion, however, an intense off-taste and a more brownish milk color was observed but a good foaming occurred.

The results from the PSD measurements can be seen in Table 1, where the area weighted particle size D[3,2] is considered to mostly reflect the oil droplet size of the emulsion and the volume weighted average diameter D[4,3] mostly mirrors the starch granule size, respectively. Smaller oil droplets are achieved with the higher protein content, but still relatively small oil droplet sizes of 2.6 μm are achieved also with the lower protein concentration.

TABLE 1

The oil droplet size D[3,2] and starch granule size D[4,3] of two different potato milks

| Sample | D[3,2] (μm) | D[4,3] (μm) |
|---|---|---|
| 0.5% Protein 3% fat | 2.492 | 69.589 |
| 0.5% Protein 3% fat | 2.810 | 48.978 |
| 1% Protein 3% fat | 1.046 | 48.183 |
| 1% Protein 3% fat | 1.865 | 63.682 |

Experiment 2—without Potato Flakes

In order to see the influence of the potato base a potato emulsion without the potato flakes were made. Therefore, only water, oil and Solanic 200 protein were used in the emulsions. The potato protein consists of 90.5% protein and the required amount of the powder was then calculated accordingly to give 0.5%, 1% and 2% protein in the final samples, respectively. Each sample was then divided into 3 batches to add 1.5% of fructose in one, 3% sucrose in the second and the third was used as a control. All the 9 samples were characterized with PSD measurement, sensory analysis, microscopic observations and foaming.

In the sensory evaluation the potato milk with 0.5% potato protein added had the best, most whitish color out of all the potato milks studied in this experiment. It also had a manageable off-taste. To this milk also 1.5% fructose was added, but it did not achieve enough sweetness. Therefore 3% sucrose was added to this milk and a relatively good sweetness was achieved that covers the off-taste quite well.

For the potato milk with 1% potato protein added a somewhat brownish color was achieved and there was an off-taste. When 1.5% fructose was added to this milk not enough sweetness was obtained. However, with 3% sucrose added the taste could be characterized as good sweetness that covered the off-taste rather well but still the off-taste was noticeable.

For the potato milk with 2% potato protein added a very intense off-taste was experienced and the color was the most brownish compared to the rest. By adding 1.5% fructose not enough sweetness was achieved. Not even with 3% sucrose added not enough sweetness to cover the off-taste was obtained. The results from the PSD measurements can be seen in Table 2. Smaller oil droplets are achieved with the two highest protein concentrations of 1 and 2% having a D[3,2] of about 0.5 µm and both of them being substantially lower than the D[3,2] of 2.6 µm for the potato milk with 0.5% protein. The former oil droplet size is in the neighborhood of the one achieved with cow milk and vegetable oat milk which was also included as a comparison.

TABLE 2

The oil droplet size D[3,2] and starch granule size D[4,3] of different milks without potato flakes.

| Sample | D[3,2] (µm) | D[4,3] (µm) |
| --- | --- | --- |
| 0.5% Protein 3% fat | 2.56 2.43 | 6.7 6.0 |
| 1% Protein 3% fat | 0.47 0.47 | 1.5 1.5 |
| 2% Protein 3% fat | 0.43 0.47 | 1.8 6.6 |
| Cow milk | 0.20 | 6 |
| Oat milk | 0.21 | 3 |

The results of the foaming experiments are presented in Table 3 and it can be deduced from these results that the three potato emulsions without potato flakes do not reach the same high initial foam heights and are also less stable as the references and moreover they are worse than those potato emulsions with potato flakes. Evidently, the potato flakes used as potato base seem to contribute to both the foam height and stability.

TABLE 3

Foaming experiments with different potato emulsions and references measuring initial foam height and the time it takes to disappear.

| Sample | Foam height (ml) | Time to disappear (s) |
| --- | --- | --- |
| Cow milk (3% fat) | 25 | 20 |
| Vegetable oat milk(3% fat) | 27 | 50 |
| 0.5% protein with potato flakes(3% fat) | 8 | 35 |
| 1% protein with potato flakes (3% fat) | 6 | 30 |
| 0.5% protein (3% fat) without potato flakes | 4 | 13 |
| 1% protein (3% fat) without potato flakes | 3 | 10 |
| 2% protein (3% fat) without potato flakes | 5 | 15 |

Example 3—Emulsifier of Vegetable Origin (Deoiled Soybean Lecithin)

In this experiment another emulsifier, deoiled soya lecithin, was used instead of potato protein. The ingredients were 2.9% potato flakes, 3% fructose and 0.09/0.18% soybean lecithin, 3% rapeseed oil and 91.01/90.02% water. The soybean lecithin was added via the oil, i.e. it was added in the oil phase instead of in the water phase, which was the case when using potato protein as the emulsifier. The lecithin was added at two different levels, one with 3% of the 3% fat phase and the other with 6% of the 3% fat phase. Two batches were prepared for each level of soybean lecithin, out of which, one went through the valve homogenizer (150 bar) and the other was used as a control sample. All the four samples were then characterized.

In the sensory evaluation of the four potato emulsions the soy lecithin did not give any off-taste, which was the case when using added potato protein as the emulsifier. Appearance wise, the color was great and the consistency was smooth when homogenized. There was, however, separation after 1 days' storage.

The results from the PSD measurements of the two potato emulsions with different amounts of deoiled soy lecithin added with and without valve homogenization (control) can be seen in Table 4. When valve homogenized the D[3,2] is around 12 µm that is smaller than only using potato flakes but larger when potato protein is added. That means that the potato protein is the most efficient emulsifier among the two emulsifiers compared, but it gives rise to more off-flavour than the soy lecithin. Using the valve homogenizer is crucial to obtain the smaller oil droplets as the D[3,2] for the control is as high as around 45 µm. There is no difference in oil droplet size at the two different concentrations of soy lecithin used.

TABLE 4

The oil droplet size D[3,2] and starch granule size D[4,3] when using soy lecithin as emulsifier

| Sample | D[3,2] (µm) | D[4,3] (µm) |
| --- | --- | --- |
| 0.09% Soy lecithin added and valve homogenised | 12.74 | 71.44 |
| 0.09% Soy lecithin added and valve homogenised | 13.14 | 73.96 |
| 0.09% Soy lecithin added not valve homogenized | 45.51 | 163.25 |
| 0.09% Soy lecithin added not valve homogenized | 49.58 | 164.57 |
| 0.18% Soy lecithin added and valve homogenised | 12.90 | 77.68 |
| 0.18% Soy lecithin added and valve homogenised | 12.70 | 71.07 |
| 0.18% Soy lecithin added not valve homogenized | 45.21 | 157.92 |
| 0.18% Soy lecithin added not valve homogenized | 41.49 | 164.19 |

Experiment 4—Deoiled Rapeseed and Deoiled Sunflower Lecithin

Two samples were prepared with two different types of lecithin, namely deoiled rapeseed and deoiled sunflower lecithin, respectively added into the oil phase. The lecithin added mounted to 0.18% overall. Both the samples were then characterized. The ingredients were 2.9% potato flakes, 3% fructose, 0.18% lecithin, 3% rapeseed oil and 90.92% water.

In the sensory evaluation of the potato emulsions with 0.18% Sunflower lecithin good whitish colour and consistency was obtained. It gave rise to somewhat off-taste and after a while there is some separation. But it did not feather when added into coffee.

For the potato milk with 0.18% Rapeseed lecithin the most appealing color overall, in milk and in coffee was achieved, but it also gave somewhat off-taste. There was a separation in the milk but the sample did not feather when added into coffee.

The potato milks with 0.09 and 0.18% soy lecithin had a less appealing color compared to the rapeseed and sunflower lecithin. They also showed a separation after a day of storage. However, they had a little bit better taste than the other lecithins and they did not feather in the coffee.

The results from the PSD measurements of the two potato emulsions with sunflower and rapeseed lecithin added can be seen in table 5. It is interesting to note that D[3,2] is about 7-8 µm for those type of lecithins and is smaller than the D[3,2] of around 12 µm that was observed for the soy lecithin stabilized emulsions. The D[4,3] is in the same range for all the lecithins tried and are probably mostly governed by the size of the starch granules originated from the potato flakes.

TABLE 5

The oil droplet size D[3,2] and starch granule size D[4,3] when using rapeseed and sunflower oil lecithin as emulsifiers

| Sample | D[3,2] | D[4,3] |
|---|---|---|
| 0.18% Sunflower lecithin added | 8.075 | 69.908 |
| 0.18% Sunflower lecithin added | 8.384 | 74.249 |
| 0.18% rapeseed lecithin added | 7.113 | 64.851 |
| 0.18% rapeseed lecithin added | 7.595 | 77.188 |

The results of the foaming experiments for the two emulsions using sunflower and rapeseed lecithin as an emulsifier are collected in Table 6. Among the lecithins studied the rapeseed lecithin seems to give the best foam followed by soy lecithin and ultimately sunflower lecithin. The foaming behavior is similar or even better for the potato emulsion stabilised by 0.5% potato protein added.

TABLE 6

Foaming experiments with different potato emulsions when adding sunflower, rapeseed and soy lecithin at 0.18% measuring initial foam height and the time it takes to disappear.

| Sample | Foam height (ml) | Time to disappear (s) |
|---|---|---|
| 0.18% Sunflower lecithin added | 2 | 20 |
| 0.18% rapeseed lecithin added | 7 | 50 |
| 0.18% Soy lecithin added | 4 | 40 |

Experiment 5—Different Types of Lecithins

Three samples were prepared with three different types of lecithin namely deoiled rapeseed, deoiled sunflower and deoiled soy lecithin, respectively, at a higher concentration of 0.5%. The lecithins were added into the oil phase. The rest of the ingredients (2.9% potato flakes, 3% fructose, 0.5% lecithin, 3% rapeseed oil and 90.65 water) were mixed into the water phase.

In the sensory evaluation it was found that the increase in the lecithin concentration up to 0.5% gave a better whitish color to the samples, and they did not give rise to any odd off-taste overall. The samples felt thick during the tasting and some oiliness could be tasted as well.

The potato emulsion with 0.5% Sunflower lecithin had the best taste among all the samples and tasted more like cow milk. The emulsion with 0.5% soy lecithin also had a good taste and gave rise to no off taste. The emulsion with 0.5% Rapeseed lecithin had somewhat off taste.

TABLE 7

The oil droplet size D[3,2] and starch granule size D[4,3] when using sunflower, rapeseed and soy lecithin at a concentration of 0.5% as emulsifiers

| Sample | D[3,2] | D[4,3] |
|---|---|---|
| 0.5% Sunflower lecithin | 6.133 | 74.891 |
|  | 6.218 | 74.587 |
| 0.5% Rapeseed lecithin | 5.300 | 76.185 |
|  | 5.666 | 74.489 |
| 0.5% Soy lecithin | 7.349 | 69.645 |
|  | 7.410 | 70.616 |

The results from the PSD measurements of the three potato emulsions with sunflower, rapeseed and soy lecithin added can be seen in table 7. It is interesting to note that the lowering of D[3,2] is relatively small to about 5-6 µm for the two first lecithin at this higher concentration, which was 7-8 µm at the lower concentration. But for the soy lecithin the lowering of the oil droplet size is more substantial going from a D[3,2] of around 12 µm at the lower concentration of 0.18% down to 7 µm at 0.5%. The D[4,3] is in the same range for all the lecithins tried and are probably mostly governed by the size of the starch granules originating from the potato flakes.

TABLE 8

Foaming experiments with different potato emulsions when adding sunflower, rapeseed and soy lecithin at 0.5% measuring the initial foam height and the time it takes to disappear.

| Sample | Foam height (ml) | Time to disappear (s) |
|---|---|---|
| 0.5% Sunflower | 7 | 40 |
| 0.5% Rapeseed | 6 | 65 |
| 0.5% Soy | 8 | 45 |

The results of the foaming experiments for the three emulsions using sunflower, rapeseed and soy lecithin at a concentration of 0.5% as an emulsifier are collected in Table 8. Among the lecithins studied the rapeseed lecithin seems to give the most stable foam followed by soy lecithin and ultimately sunflower lecithin although they are rather similar. The higher concentration of 0.5% gives a somewhat higher foam height and stability compared to the lower concentration of 0.18% for all the lecithins investigated.

Experiment 6—Different Lecithins and Potato Protein

Three samples were prepared with three different types of lecithin namely deoiled rapeseed, deoiled sunflower and deoiled soy lecithin, respectively added in the oil. There was also a fourth sample made using soy lecithin with the same composition as the other samples (2.9% potato flakes, 3% fructose, 0.18% lecithin, 3% rapeseed oil, 0.22% solanic 200 and 90.7% water) except that the potato flakes were not included in this case. The amount of Solanic 200 was added in the water phase for all the samples and it was calculated to give an overall 0.22% protein content.

In the sensory evaluation all the samples were white in color and with a good texture. The presence of potato flakes gave a more satisfactory rich mouth feel. All the samples tasted well, without any off-taste despite using Solanic 200, probably due to the low concentration compared to the former samples. The sample without the potato flakes did not taste so great compared to the other three samples.

The results from the PSD measurements of the four potato emulsions with sunflower, rapeseed and soy lecithin (with and without potato flakes) at a concentration of 0.18% together with 0.22% potato protein as emulsifiers can be seen in table 9. It is interesting to note that there is a substantial lowering of D[3,2] compared to only using the lecithins now varying between 2-4 μm instead of about 7-8 μm for the two first lecithins and for the soy lecithin having a D[3,2] of around 12 μm at the lower concentration of 0.18%.

Moreover, the D[3,2] is in the neighborhood of the oil droplet size of 0.5% potato protein stabilized emulsions. These observations further substantiate the hypothesis of a complex formation between the protein and the lecithin at the interface of the oil globule. It is further interesting to observe that without potato flakes the oil droplets are smaller when using soy lecithin. That can depend on a lower viscosity of the continuous phase thereby making the emulsification procedure easier.

The D[4,3] is in the same range for all the lecithins tried with potato flakes added and are probably mostly governed by the size of the starch granules originating from the potato flakes.

TABLE 9

The oil droplet size D[3,2] and starch granule size D[4,3] of a potato emulsion, when using sunflower, rapeseed and soy lecithin (with and without potato flakes) at a concentrations of 0.18% together with 0.22% potato protein as emulsifiers. Two measurements of each sample.

| Sample | D[3,2] | D[4,3] |
|---|---|---|
| 0.18% Rapeseed + | 2.902 | 63.581 |
| 0.22% potato protein | 3.902 | 62.790 |
| 0.18% Sunflower + | 2.888 | 67.795 |
| 0.22% potato protein | 2.437 | 64.729 |
| 0.18% Soy + | 4.745 | 69.943 |
| 0.22% potato protein | 4.227 | 69.866 |
| 0.18% Soy without | 2.563 | 19.640 |
| potato flakes | 2.635 | 10.267 |
| 0.22% potato protein | | |

The results of the foaming experiments for the four emulsions using sunflower, rapeseed and soy lecithin (with and without potato flakes) at a concentrations of 0.18% together with 0.22% potato protein as emulsifiers are collected in Table 10. Among the lecithins studied the rapeseed and the sunflower lecithin seem to give the best foam followed by soy lecithin. The foam heights seen in Table 10 are the best and approaches those of cow milk and vegetable oat milk as seen in Table 3.

TABLE 10

Foaming experiments with different potato emulsions when adding sunflower, rapeseed and soy lecithin (with and without potato flakes) at a concentrations of 0.18% together with 0.22% potato protein as emulsifiers, measuring the initial foam height and the time it takes to disappear.

| Sample | Foam height (ml) | Time to disappear (s) |
|---|---|---|
| 0.18% Rapeseed lecithin + 0.22% protein | 13 | 58 |
| 0.18% Sunflower lecithin + 0.22% protein | 17 | 60 |
| 0.18% Soy lecithin + 0.22% protein | 10 | 54 |
| 0.18% Soy lecithin + 0.22% protein without potato flakes | 2 | 4 |

The pH of the emulsions have also been measured. The pH is even lower when the protein is added being around 5.7 as compared to 5.9 without the protein, but it is still lower than the pH of cow milk, which ranges from 6.4 to 6.8. The pH was adjusted to the pH of milk up to 7.0. Moreover, when added to coffee having a pH around 5 a buffer was added in the potato emulsion regulating for a higher pH of the coffee on potato emulsion milk addition, thereby reducing the experienced bitterness of coffee.

The potato emulsions obtained in this experiment were considered to be good enough to try them out in a real coffee shop where caffe lattes are made. The potato emulsions in experiment 6 with three lecithin and protein as emulsifieres were added to the latte and it was found that the sunflower lecithin had the highest and the most stable foam followed by the rapeseed lecithin, while the soy lecithin showed the least foam height and stability. With respect to taste it was found that potato emulsions with rapeseed and sunflower lecithin gave a better taste compared to soy lecithin.

Experiment 7—to Evaluate the Amount of Protein Solanic 300 Added and a Buffer System and if Lecithins can be Deleted The following recipes were used, and five samples of 500 g were produced:

| Ingredient | Emulsion 6 Content (%) | Emulsion 7 Content (%) | Emulsion 8 Content (%) | Emulsion 9 Content (%) | Emulsion 10 Content (%) |
|---|---|---|---|---|---|
| Potato flakes | 3.08 | 3.08 | 3.08 | 3.08 | 3.2 |
| Fructose | 4 | 4 | 4 | 4 | 4 |
| Sunflower Lecithin | — | — | 0.18 | 0.18 | 0.18 |
| Rapeseed oil | 3 | 3 | 3 | 3 | 3 |
| Solanic300 | 0.6 | 0.7 | 0.6 | 0.7 | 0.6 |
| Buffer | 89.32 | 89.22 | 89.14 | 89.04 | 89.02 |

The appearance, taste and pH of the potato milks 6-10 can be seen in the table below and compared with an oat drink:

| Emulsion | Appearance | Taste | pH |
|---|---|---|---|
| 6 | More whitish | a little bit salty | 6.96 |
| 7 | " | Sweeter than 6 | 6.95 |
| 8 | More greyish | Sweeter than 6 and 7 | 6.99 |

-continued

| Emulsion | Appearance | Taste | pH |
|---|---|---|---|
| 9 | " | Sweeter than 6 and 7 | 7.00 |
| 10 | " | a little bit salty | 7.01 |
| Oat drink | Most yellowish | Little salty but oat taste dominates | 7.33 |

There is still no problem with the pH of the different potato milks being around pH 7. When we left out the lecithin we got a somewhat more whitish appearance, which is good. The sweet salty taste is still there and it was preferable compared to the oat drink taste.

A caffe latte test was performed with regard to feathering and foam height in coffee. The results of this test can be seen in the Table below:

| Emulsion | Foam height from beginning (ml) | Foam height after 5 min; Drainage (ml/min) | Appearance | Taste |
|---|---|---|---|---|
| 6 | 275 − 125 = 150 | 250 − 160 = 90; 60/5 = 12 | Clear feathering | Some saltiness |
| 7 | 280 − 100 = 180 | 270 − 160 = 110; 70/5 = 14 | Clear feathering | Some saltiness |
| 8 | 300 − 150 = 150 | 275 − 185 = 90; 60/5 = 12 | Smaller feathering | sweet |
| 9 | 290 − 120 = 170 | 275 − 175 = 100; 70/5 = 14 | Smaller feathering | sweet |
| 10 | 275 − 110 = 165 | 250 − 165 = 85; 80/5 = 16 | Smaller feathering | salty |
| Oat drink | 350 − 260 = 260 | 320 − 170 = 150; 110/5 = 22 | No feathering | Bitter and oat taste |

Firstly, we can observe that the emulsions without lecithins (emulsion 6 and 7) had clear feathering compared to the ones with (emulsions 8-10), so this component cannot be deleted. Therefore, there was added more lecithin up to 0.4 and 0.5%, which was found optimal. There is also a tendency that emulsion 7 and 9 with the higher protein content of 0.7% gives a better foam height.

Experiment 8—Lowering of the Potato Content

In this series of experiments, we have lowered the potato content to 1.0, 1.5 and 2.0% potato flakes in the potato emulsions.

The following recipes were used, and five samples of 500 g were produced:

| Ingredients | Emulsion 5.3 | Emulsion 2 | Emulsion 2a | Emulsion 2b | Emulsion 2c |
|---|---|---|---|---|---|
| Potato flakes normal | 5 | 15.4 | 10 | 7.5 | 5 |
| Fructose | 20 | 20 | 20 | 20 | 20 |
| Lecithin | 2 | 2.5 | 2.5 | 2.5 | 2.5 |
| Rapeseed oil | 7.5 | 15 | 15 | 15 | 15 |
| Solanic 300 | 3.5 | 3.5 | 3.5 | 3.5 | 3.5 |
| Water | 231 | 221.8 | 224.5 | 225.8 | 227 |
| Buffer | 231 | 221.8 | 224.5 | 225.8 | 227 |
| Total | 500 | 500 | 500 | 500 | 500 |

The oil droplet size distribution (D[4,3] and D3,2), appearance, taste and pH of the potato milks 5.3, 2, 2a, 2b and 2c can be seen in the table below:

| Emulsion | D[4,3] | D[3,2] | Appearance | Taste | pH |
|---|---|---|---|---|---|
| 5.3 | 26,874 | 6,922 | Look the same as before | Good | 6.90 |
| 2 | 50,742 | 5,478 | Look alike 5.3 | Too thick, but can be good in coffee | 6.81 |
| 2a | 56,601 | 6,304 | Look alike 5.3 | Tasteless, relatively thick but creamy | 6.93 |
| 2b | 34,307 | 6,338 | Perhaps somewhat darker than those above | Good taste, lower thickness but still creamy | 6.90 |
| 2c | 31,526 | 6,587 | Perhaps somewhat darker than those above | Best taste, least thick | 6.92 |

Both the viscosity and the potato taste were clearly diminished, when the potato flake content was lowered from 3.08 to 1.0%. For the potato milk with 3.0% oil a creamy milk but still with a low potato taste could be the choice, perhaps a content of 1.5% potato flake. It is also interesting to note that D[4,3] goes down with the lowering of the potato flake content, which could be expected as the potato granules contribute to the high D[4,3]. The D[3,2], however, does not change very much with the potato flake content.

Experiment 9—Comparison Between a Liquid and a Dried Protein as Well as Laboratory and Industrial Production of Vegan, Potato Emulsion In the following experiments a comparison was made between a potato emulsion (herein sometimes referred to a potato milk) produced in the laboratory as well as produced industrially (2 tons). The recipes for the 1.5 and 3.0% potato milk, i.e. emulsion 5.3 and 2b, using the same recipe but exchanging the common potato protein Solanic 300 with a liquid one. These emulsions are then called emulsion 5.3 L and emulsion 2b L, respectively. With regard to the protein content there is a 4.78 times higher amount of the liquid protein compared to the powdered protein. This is due to the higher TS content in powder.

As a comparison 2 tons of potato milk 1.5 and 3.0% were produced industrially and the recipe can be seen in the 6th and 7th column in the table below (disclosed as potato-milk.Ind 1.5% and potatomilk.Ind.3.0%).

TABLE 11

Recipes of lab-made potato milks using a powdered and liquid protein and industrially made potato milks

| Ingredients | Emulsion 5.3 lab 1.5% | Emulsion 5.3 liquid 1.5% | Emulsion 2b lab 3.0% | Emulsion 2b liquid 3.0% | potato-milk.Ind. 1.5% | potato-milk.Ind. 3.0% |
|---|---|---|---|---|---|---|
| Potato flakes | 5 | 5 | 7.5 | 7.5 | 20.0 | 30.0 |
| Fructose | 20 | 20 | 20 | 20 | 80.0 | 80.0 |
| Lecithin | 2 | 2 | 2.5 | 2.5 | 8.0 | 10.0 |
| Rapeseed oil | 7.5 | 7.5 | 15 | 15 | 30.0 | 60.0 |
| Solanic 300 | 3.5 | | 3.5 | | 14.0 | 14.0 |
| Solanic 300 L | | 16.73 | | 16.73 | | |
| Water | 458.15 | 444.92 | 447.76 | 434.53 | 1820.8 | 1779.4 |
| $Na_2HPO_4*2H_2O$ | 2.961 | 2.961 | 2.878 | 2.878 | | |
| $Na_2HPO_4*12H_2O$ | | | | | 23.8 | 23.2 |
| $NaH_2PO_4*H_2O$ | 0.893 | 0.893 | 0.864 | 0.864 | 3.6 | 3.5 |
| Total | 500 | 500 | 500 | 500 | 2000.2 | 2000.0 |

Characterisation of the Potato Emulsions

The appearance, taste and pH of the potato milks 5.3 lab, 5.3 liquid and 5.3 ind. and 2b lab, 2b liquid and 2b ind. can be seen in the table 12 below:

TABLE 12

| Emulsion | Appearance | Taste | pH | D[3,2] (μm) | D[4,3] (μm) |
|---|---|---|---|---|---|
| 5.3 lab | yellowish | Little bit better taste than 5.3 liquid | 6.86 | 6.35 | 33.39 |
| 5.3 Liquid | yellowish | More grainy and less fresh | 6.65 | 7.76 | 32.82 |
| 5.3 Ind. | whiter | More fresh taste, sweeter, no graininess | 6.90 | 0.56 | 4.45 |
| 2b lab | yellowish | Some taste of oil | 6.61 | 6.16 | 39.66 |
| 2b liquid | yellowish | Some off-taste of metallic | 6.84 | 5.62 | 35.49 |
| 2b Ind. | whiter | Fresher taste, no taste of oil, more creamy than the 1.5% potato milk | 6.87 | 1.57 | 8.26 |

There is a striking difference in oil droplet size (D[3,2] and D[4,3]) between the industrially produced potato milk compared to the two emulsions made in the lab for both the low and the high fat content, where the industrially produced is so much better, having such small oil droplet sizes so it can be compared to milk. This is the main reason for the whiter appearance for the industrially produced potato milk. Even the pH is the highest and the taste is the freshest for the ind. produced. The smallest oil droplet size of D[3,2] equal to 0.56 μm is obtained for the ind. produced 1.5% potato milk. The two milks made in the lab. are more similar in behavior, where the liquid protein have a somewhat less pleasant taste.

Caffe Latte Test

A caffe latte test was performed for the prepared emulsions. The result can be seen in table 13 below:

TABLE 13

| Emulsion | Foam height from beginning (ml) | Foam height after 5 min; Drainage (ml/min) | Appearance | Taste | pH in coffee |
|---|---|---|---|---|---|
| 5.3 lab | 250 | 150 100/5 = 20 | Some feathering, not so dense foam | No after taste | 6.68 |
| 5.3 Liquid | 220 | 150 70/5 = 14 | Some feathering, not so dense foam | No after taste | 6.65 |
| 5.3 Ind. | 300 | 200 100/5 = 20 | No feathering, very dense foam, more whitish foam | So good | 6.65 |
| 2b lab | 200 | 130 70/5 = 14 | Some feathering | No after taste | 6.61 |
| 2b Liquid | 200 | 140 60/5 = 12 | Some feathering | No after taste | 6.60 |
| 2b Ind. | 270 | 150 120/5 = 24 | No feathering | Best taste almost like milk | 6.56 |

The initial foam height is very good 270-300 ml for the industrially produced potato milk, whereas the two lab-versions are slightly lower from 200 to 250 ml. The foam height after 5 min:s drainage is the highest for the industrially produced potato milks, especially for the 1.5% potato milk. The drainage in ml/min is above 20 for the industrially produced potato milks, which is more similar to real milk and oat drink and soy milk, whereas the lab-versions are below 20. With regard to these investigated properties there do not seem to be any differences between the liquid protein and the powdered one, which also seem to be the case with regard to appearance and taste. But the industrially produced potato milks gave rise to more dense foams and no feathering occurred. There was no difference in the pH of the coffees comparing all investigated samples.

Conclusively, this industrial production of the potato milks (potato emulsion) was very successful.

Shelf Life

The industrially produced and UHT (ultra heat treated) potato emulsion should have a shelf life of 18 months with substantially remaining properties as described herein.

Thus, according to the present invention a potato emulsion has been provided as an alternative to cow milk or any other vegetable drink having the ability to provide a stable foam which makes the potato emulsion suitable to be used as a vegan alternative to drink as such or added in beverages such as coffee and tea. The potato emulsion is additional whitish and the oil droplets in the emulsion are not flocculated.

The invention claimed is:

1. A vegan potato emulsion, consisting of:
   heat treated potato flakes in an amount of 0.5-5% by weight;
   at least one sugar in an amount of 0-5% by weight;
   at least one vegetable emulsifier in an amount of 0.09-1.0% by weight;
   at least one vegetable oil selected from rapeseed oil, olive oil, maize oil, sunflower oil, soybean oil, peanut oil, sesame oil and linseed oil and avocado oil in an amount of 0.50-6% by weight;
   at least one vegetable protein selected from a potato protein, a pea protein, and a soy protein in an amount of 0.20-3% by weight;
   optionally a flavoring agent; and
   water adding up to 100% by weight, wherein
   the vegan potato emulsion has an oil droplet size D[3,2] of 0.1-10 μm,
   the vegan potato emulsion is an alternative milk product, and
   the at least one vegetable emulsifier is a vegetable lecithin.

2. The vegan potato emulsion according to claim 1, wherein the at least one sugar is selected from a monosaccharide, disaccharide and a polyol.

3. The vegan potato emulsion according to claim 1, wherein the vegetable lecithin is selected from rapeseed lecithin, sunflower lecithin, and soy lecithin.

4. The vegan potato emulsion according to claim 1, wherein the heat treated potato flakes are potato flakes which have been heated to at least 100° C.

5. The vegan potato emulsion according to claim 1, wherein the at least one vegetable emulsifier is added to the vegan potato emulsion via the at least one vegetable oil.

6. The vegan potato emulsion according to claim 1, wherein the at least one sugar is present in an amount of 0-3% by weight.

7. The vegan potato emulsion according to claim 1, wherein the at least one vegetable emulsifier is present in an amount of 0.09-0.5% by weight.

8. The vegan potato emulsion according to claim 1, wherein the at least one vegetable oil is present in an amount of 0.5-3% by weight.

9. The vegan potato emulsion according to claim 1, wherein the at least one vegetable protein is present in an amount of 0.2-1% by weight.

10. The vegan potato emulsion according to claim 1, wherein the oil droplet size D[3,2] of the vegan potato emulsion is 0.1-5 μm.

11. The vegan potato emulsion according to claim 1, wherein the flavoring agent is added to the vegan potato emulsion.

12. The vegan potato emulsion according to claim 1, wherein after being whipped, the vegan potato emulsion forms a foam, and-the foam maintains a stable foam height after five minutes.

13. The vegan potato emulsion according to claim 1, wherein the oil droplet size D[3,2] of the vegan potato emulsion is 0.5-3 μm.

* * * * *